United States Patent [19]

Shiga et al.

[11] 4,026,992

[45] May 31, 1977

[54] METHOD FOR REMOVING NITROGEN OXIDES FROM COMBUSTION EXHAUST GASES

[75] Inventors: Shujiro Shiga, Chiba; Takeshi Katsumata, Ichihara; Eiji Inaba, Ichihara; Yasushi Okamoto, Ichihara; Atsushi Inmaru, Togane; Tsugio Nishioka, Ichihara; Takashi Nakata, Ichihara; Seiji Takaki, Ichihara, all of Japan

[73] Assignee: Sumitomo Chemical Company, Limited, Japan

[22] Filed: Oct. 31, 1975

[21] Appl. No.: 627,762

[30] Foreign Application Priority Data

Nov. 6, 1974 Japan .......................... 49-128474

[52] U.S. Cl. .............. 423/239; 423/242; 55/8; 55/122
[51] Int. Cl.² ......................................... B01D 53/34
[58] Field of Search .................. 423/235, 239, 242; 55/8, 122

[56] References Cited

UNITED STATES PATENTS

| | | | |
|---|---|---|---|
| 1,284,167 | 11/1918 | Welch | 423/522 |
| 3,887,683 | 6/1975 | Abe et al. | 423/239 X |
| 3,920,421 | 11/1975 | Collins | 423/255 |

FOREIGN PATENTS OR APPLICATIONS 1,471,620   7/1972   Germany

*Primary Examiner*—G. O. Peters
*Attorney, Agent, or Firm*—Birch, Stewart, Kolasch and Birch

[57] ABSTRACT

A method for removing nitrogen oxides from combustion exhaust gases obtained after removing sulfur oxides by a wet process, which is characterized in that the gases obtained after removing sulfur oxides from the combustion exhaust gases by a wet process are introduced into a wet electrostatic precipitator to remove most of the impurities such as dusts, fumes and mists, passed through a dummy catalyst layer in the form of a fixed bed or a moving bed to remove the remaining impurities which is set before or after heating the gases to a temperature suitable for the reaction of reducing nitrogen oxides, and passed through a metal oxides catalyst layer in the form of a fixed bed in the presence of ammonia which is used at least in the stoichiometric amount required for reducing nitrogen oxides to nitrogen gas by which the gases containing nitrogen oxides are reduced to harmless gases.

10 Claims, 1 Drawing Figure

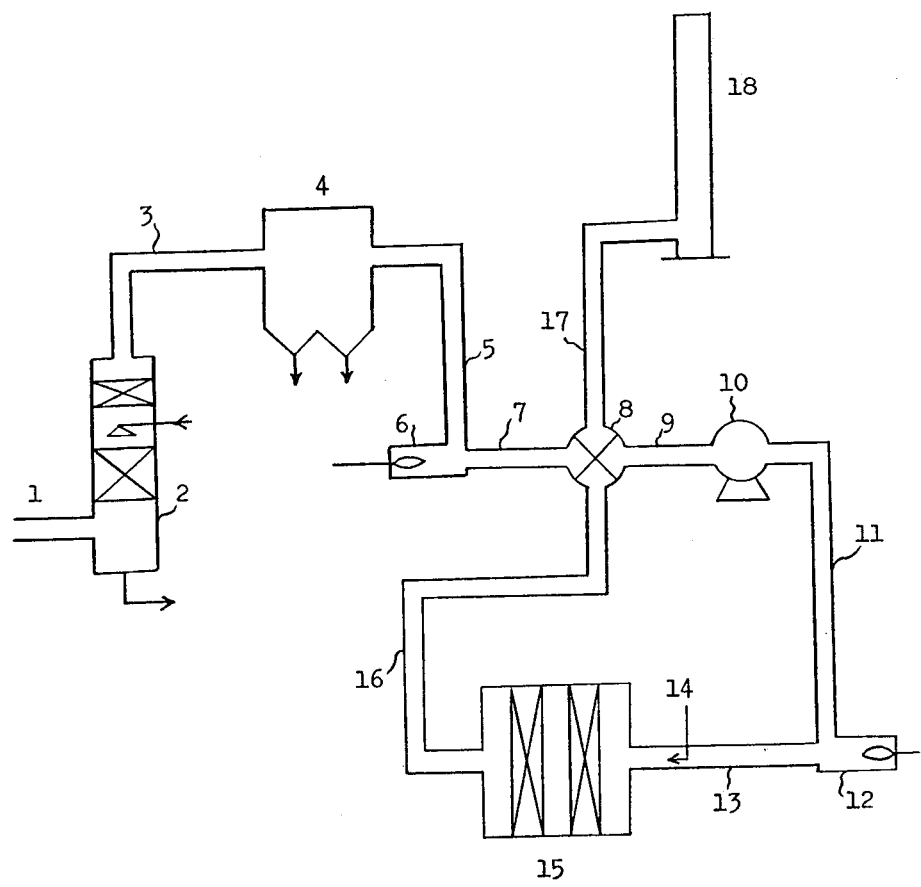

METHOD FOR REMOVING NITROGEN OXIDES FROM COMBUSTION EXHAUST GASES

The present invention relates to a method for removing nitrogen oxides contained in the exhaust gases of combustion. More particularly, it relates to a method for removing nitrogen oxides from the gases exhausted from a boiler, a heating furnace or the like by first subjecting the exhaust gases to a wet sulfur oxides removal process to remove sulfur oxides therefrom and then subjecting the resulting gases to a catalytic reduction to remove the nitrogen oxides therefrom.

A heavy oil used as a fuel for a boiler or the like contains usually 1 to 4% by weight of sulfur, and hence the exhaust gases of combustion thereof contain usually 500 to 2,000 ppm of sulfur oxides and 100 to 2,000 ppm of nitrogen oxides. Among nitrogen oxides in the exhaust gases of combustion, nitrogen monoxide and nitrogen dioxide are most harmful to the human body and cause photochemical smog.

From the standpoint of the prevention of air pollution, extensive efforts been made to reduce the concentration of these sulfur oxides and nitrogen oxides contained in the combustion exhaust gases. Among these air pollutants, sulfur oxides such as sulfur dioxide and sulfur trioxide have been aimed at far earlier than nitrogen oxides and various recovery systems for removing sulfur oxides have already been developed and attached to boilers or the like. Besides, the sulfur oxides removal system is mainly a wet system [Environmental Science & Technology 6 (8) 688 (1972)].

It is known that sulfur oxides contained in the exhaust gases can be removed by a wet system, for instance, by using an absorbent such as an aqueous solution or a slurry of sodium sulfite, calcium hydroxide or the like wherein the absorbent is regenerated and circulated or spent out as the sulfate. Besides, there are known some methods for catalytically reducing nitrogen oxides contained in the combustion exhaust gases to nitrogen gas (U.S. Pat. No. 3,279,884 and West German Patent Specification No. 1,259,298).

It is well known that in case of removing sulfur oxides and nitrogen oxides from combustion exhaust gases by absorbing sulfur oxides by a wet sulfur oxides removal process and then catalytically reducing nitrogen oxides to harmless nitrogen by contact with a reducing agent (e.g. ammonia), various problems are encountered in a nitrogen oxides removal system. That is, the gases obtained after removing sulfur oxides from the exhaust gases by a wet process are usually saturated with moisture at 50° to 60° C and further contain somewhat an entrainment of the absorbent used for sulfur oxides removal, unabsorbed $SO_2$ and $SO_3$ and smoke dusts originated from the boiler exhaust gases. When the gases are subjected to the nitrogen oxides removal process without removing these materials contained therein, clogging of the catalyst layer, an increase of the pressure loss, the lowering of the catalyst activity, clogging of the heat exchanger, or the like are caused.

Accordingly, it is necessary to remove dusts from the gases obtained after removing sulfur oxides contained in the combustion exhaust gas by a wet process prior to the removal of nitrogen oxides by a dry catalytic reduction.

The removal of dusts is usually carried out by a spray tower, a venturi scrubber, or the like. However, such a method still has various problems for the practice in the industrial scale, because of the too large volume of gases to be treated and further the difficulty in the disposal of the resulting waste liquid containing dusts.

Under the circumstances, the present inventors have intensively studied to eliminate the defects in the conventional methods have found an improved method for removing nitrogen oxides from the gases obtained after removing sulfur oxides from the combustion exhaust gases by a wet process without such defects.

An object of the present invention is to provide an improved method for removing nitrogen oxides from the gases obtained after removing sulfur oxides from the combustion exhaust gases by a wet process.

Another object of the invention is to provide a method for removing effectively dusts and other obstacles from the gases obtained after removing sulfur oxides from the combustion exhaust gases by a wet process prior to subjecting the gaseous to a nitrogen oxides removal process.

A further object of the invention is to provide a method for removing nitrogen oxides from the gases which have had sulfur oxides removed therefrom by a catalytic reduction in the presence of ammonia without significant lowering of the catalytic activity owing to dusts or the like contained in the gases.

These and other objects of the invention will be apparent from the description hereinafter.

The method of the present invention comprises passing the gases obtained after removing sulfur oxides from the combustion exhaust gases by a wet process through a wet electrostatic precipitator, passing the resultant firstly through a dummy catalyst layer (hereinafter, referred to as "the first dummy catalyst layer") and then passing the gases through a catalyst layer for the catalytic reduction of nitrogen oxides (hereinafter, referred to as "the second catalyst layer") in the presence of ammonia, whereby nitrogen oxides are reduced to nitrogen gas.

According to the present invention, the dust contained in the gases is effectively removed by passing through a wet electrostatic precipitator, by which the clogging of the catalyst layer is avoided, and further dusts (i.e., solid dispersoids) and mists (i.e., liquid dispersoids) such as free $SO_3$, or alkali metal or alkaline earth metal salts of $SOx$ such as sulfates and sulfites which are catalyst poisons can be removed by passing through the wet electrostatic precipitator and the first dummy catalyst layer, by which the lowering of the catalyst activity is effectively prevented, and further the clogging of the heat exchanger owing to the precipitates of $(NH_4)_2SO_4$, $NH_4HSO_4$, etc. can be prevented because of the removal of the free $SO_3$. As the results, the apparatus for removing nitrogen oxides can be continuously operated for a long time.

The gas obtained after removing sulfur oxides by a wet process means a gas obtained by decreasing the concentration of sulfur dioxide in a combustion exhaust gas by using an absorbent such as an aqueous solution or slurry of sodium sulfite, potassium sulfite, calcium hydroxide, etc., which has still a small amount of sulfur oxides, that is, it is a wet gas containing a small amount of $SO_2$ gas, and a slight amount of $SO_3$ mists, smoke dusts, entrainment of the absorbent, etc. and having a temperature of 50° to 60° C.

The gas obtained after removing sulfur oxides is firstly passed through a wet electrostatic precipitator to remove most of the impurities from the gas. The wet electrostatic precipitator employed in the present invention is a conventional apparatus for removing solid or liquid particles from the wet gas, which comprises applying a high-voltage between the collecting electrodes and the discharge electrodes with a direct current to produce a corona discharge, passing through the wet gas to be treated between the both electrodes, whereby particles carried by the gas are ionized and absorbed onto the collecting electrodes, washing out the adsorbed solid particles with an electrode plate-washing liquid or the liquid film of the absorbed liquid particles per se and then removing the precipitated particles out of the system.

In case of removing condensable gas components (e.g. $SO_3$) as well as solid particles, the wet electrostatic precipitator is particularly useful, when the wet gas to be treated is present at a temperature of lower than the dew point of the gas components to be removed.

In addition to the wet electrostatic precipitator, there has been used an electrostatic precipitator of a dry system wherein the particles adsorbed onto the collecting electrodes are mechanically removed off by hammering. However, such a dry electrostatic precipitator can not be used for removing particles from the wet gas, because when the collecting electrodes are wetted, it becomes impossible to remove the adsorbed particles by hammering. When the wet gas is dried by heating, the dry electrostatic precipitator may also be applied thereto, but in such a case, the condensable gas components can not be removed.

The electrostatic precipitator is usually operated under the conditions of the electric field strength: 2,500 to 6,000 V/cm, the current density of the collecting electrodes: 0.2 to 0.8 $mA/m^2$, and the retention time of the gas between the electrodes: 1 to 30 seconds. By comparing the amounts of the solid materials, the total amount of the mists or the like contained in the gas at the inlet and outlet of the precipitator, the removal ratios of the dusts, total mists, etc., can be calculated.

When the gas obtained after removing sulfur oxides from the combustion exhaust gas by a wet process is passed through the wet electrostatic precipitator, most of the impurities, i.e., substantially all of the $SO_3$ mists and most of the dusts and the total mists are removed.

The gas thus treated is, as it stands or after heating to a temperature suitable for the catalytic reduction of nitrogen oxides, passed through the first dummy catalyst layer. Thus, the first dummy catalyst layer may be set before or after heating the gas to a temperature suitable for the reduction of nitrogen oxides. The first dummy catalyst layer is used for the purpose of removing the remaining impurities, i.e., a slight amount of the dusts and mists which can not be removed by the wet electrostatic precipitator. The first dummy catalyst layer may be in the form of a fixed bed or a moving bed.

The gas passed through the dummy catalyst layer is then passed through the metal oxide catalyst layer (the second catalyst layer) in the presence of ammonia at a temperature suitable for the reduction of nitrogen oxides.

The metal oxides catalyst layer is used for the purpose of reducing the nitrogen oxides contained in the gas in the presence of ammonia. The metal oxides catalyst layer is in the form of a fixed bed.

The first dummy catalyst layer is not required to have the catalystic activity for reducing nitrogen oxides as the second catalyst layer, but it should not suffer from violent chemical change by the exhaust gas components and further should not be mechanically cracked or pulverized. The first dummy catalyst layer has preferably the same or similar physical form of that of the second catalyst layer, and suitably the dummy catalyst is made of the same carrier as that for the second catalyst, and it may have the same or a smaller particle size than that of the second catalyst.

The carrier for the second catalyst may be, for instance, alumina ($Al_2O_3$), silica ($SiO_2$), aluminosilicate diatomaceous earth, silicon carbide, titanium oxide or the like which may be in the form of a pellet, a tablet, a ball or a molded product, but the dummy catalyst is not limited thereto, and may have a smaller particle size than that of the second catalyst. When the dummy catalyst is used for a fixed period of time, it is taken out from the system, washed to remove the materials adsorbed on the surface and dried, by which the dummy catalyst is regenerated and can be used again.

When the first dummy catalyst layer and the second catalyst layer for removing nitrogen oxides are both used in the form of a fixed bed, they may be set in the same vessel. When the first dummy catalyst layer is not used, a slight amount of the dusts or mists passed through the wet electrostatic precipitator is directly led to the second catalyst layer for removing nitrogen oxides and covers the surface of the catalyst, which results in the lowering of the catalyst activity within a comparatively short time and in the increase of the pressure loss through the catalyst layer. Then, the catalyst layer must be exchanged and regenerated, but the exchange and regeneration of the catalyst comprising a complicated mixed metal oxide are far more difficult in comparison with the dummy catalyst. On the contrary, when the first dummy catalyst layer is set before the second catalyst layer, such very difficult exchange and regeneration of the second catalyst layer is almost not required.

The second metal oxides catalyst for removing nitrogen oxides is prepared by providing oxides of metals (e.g. vanadium, molybdenum, tungsten, etc.) on the carrier made of alumina ($Al_2O_3$), silica ($SiO_2$) the like, or a mixture thereof.

When the gas is passed through the second metal oxides catalyst layer in the presence of ammonia, nitrogen oxides contained in the gas are reduced to nitrogen gas, whereby water is by-produced. By comparing the concentrations of nitrogen oxides at the inlet and outlet of the reactor for removing nitrogen oxides, the removal ratio of nitrogen oxides can be calculated.

The catalytic reduction reaction is carried out at a temperature of 250° to 450° C, preferably 300° to 400° C and at a space velocity in the range of about 1,000 to 20,000 standard volume of the gases to be treated per volume of catalyst per hour.

Ammonia is used at least in the stoichiometric amount required for reducing nitrogen oxides to nitrogen gas (i.e., 0.667 mole to 1 mole of NO), preferably 1.0 to 2.0 times of the stoichiometric amount. Ammonia may be poured into the gas flow before the first dummy catalyst layer, or may be poured into the gas flow between the first dummy catalyst layer and the second catalyst layer for removing nitrogen oxides.

The method of the present invention is explained in more detail with reference to the accompanying drawing.

The drawing shows an embodiment of the present method. The combustion exhaust gas 1 is introduced into a sulfur oxides-recovering unit 2 (i.e., a means for removing sulfur oxides by a wet process)

The exhaust gas introduced into the sulfur oxides-recovering unit is, for instance, a gas exhausted from a boiler wherein a heavy oil is burnt. The removal of sulfur oxides in the sulfur oxides-recovering unit is carried out by using an aqueous solution of an alkali metal sulfite as the absorbent wherein the absorbent is repeatedly used for absorbing $SO_2$ after being regenerated.

The gas discharged from the unit 2 is then led into a wet electrostatic precipitator 4 through a duct 3. The gas discharged from the unit 2 has a temperature of 55° to 60° C and is saturated with moisture and contains somewhat of an entrainment of the absorbent and further $SO_3$ mists, smoke dusts, $SO_2$, nitrogen oxides, etc. In the wet electrostatic precipitator 4, the smoke dusts, the entrainment of the absorbent and $SO_3$ mists are almost removed.

The gas discharged from the precipitator 4, which is saturated with moisture and has a temperature of 55° to 60° C, is then led into a heat exchanger 8 through ducts 5 and 7, on the way of which the gas is heated to a temperature of 55° to 150° C by an after-burner 6. The heating of the gas is carried out for the purpose of drying the gas and further of keeping the temperature of the gas discharged through the duct 7 suitable for the heat exchange with the gas derived from a reactor 15 wherein a dummy catalyst layer and a catalyst layer for removing nitrogen oxides are disposed. In the after-burner 6, a gas fuel having a low content of sulfur should be used for preventing the increase of the content of sulfur oxides and dusts in the gas.

The gas discharged from the heat exchanger 8 is led into a blower 10 through a duct 9 and in turn lead into the reactor 15 through ducts 11 and 13, on the way of which the gas is heated by an after-burner 12 to a temperature of 250° to 450° C which is suitable for effecting the reduction of nitrogen oxides. In the after-burner 12, a low sulfur content fuel should be used as in the after-burner 6.

A feed nozzle 14 for supplying ammonia is provided to the gas flow before the reactor 15. In the reactor 15, two fixed beds (packed beds) are disposed, wherein a dummy catalyst is put in the first bed and a catalyst for removing nitrogen oxides is put in the second bed. The dummy catalyst bed is effective for removing a slight amount of dusts carried by the gas and is also effective for mixing the gas and $NH_3$ gas.

The $NH_3$ is supplied in the stoichiometric amount or more to the nitrogen oxides, and when the gas is passed through the catalyst layer for removing nitrogen oxides, the nitrogen oxides are reduced with $NH_3$ to give nitrogen gas, whereby $H_2O$ is produced simultaneously.

On each of the first bed and the second bed in the reactor 15, a differential pressure gauge is provided, by which the differential pressure is checked, and when the pressure loss of the dummy catalyst layer or others is increased, the dummy catalyst layer or others are exchanged at the time of repairing the apparatus which is taken at fixed periods. The gas discharged from the reactor 15 is then lead into a heat exchanger 8 through a duct 16, wherein the gas is subjected to the heat exchange with the gas discharged through the duct 7, and then is led into the stack 18 through a duct 17, whereby the gas thus treated is released from the system.

The present invention is not limited to the above one embodiment, but any other embodiments can be included in the present invention. For instance, the dummy catalyst layer and the catalyst layer for removing nitrogen oxides may be disposed in a separate vessel from ach other and both vessels may be arranged in a line, or dummy catalyst layer may be in the form of a moving bed.

According to the method of the present invention, the nitrogen oxides can be continuously removed at a removal ratio of 90% or more without any trouble from the gases such as boiler exhaust gas obtained after removing sulfur oxides by a wet process which contains, for example, about 20 $g/Nm^3$ of the total mists shout about 15 ppm of $SO_3$, about 30 $mg/Nm^3$ of dusts and 100 to 2,000 ppm of nitrogen oxides.

The present invention is illustrated by the following Examples but is not limited thereto.

EXAMPLE 1

In accordance with the process as shown in the accompanying drawing, a part of the exhaust gas (55° C) discharged from a sulfur oxides-recovering unit by a wet process (absorbent: $Na_2SO_3$ which is repeatedly used after being regenerated) constructed in a boiler plant is taken out through an iron-made duct, passed through a small, stainless steel-made wet electrostatic precipitator, heated with an iron-made electric heater, mixed with ammonia gas before an iron-made reactor wherein a dummy catalyst layer and a catalyst layer for removing nitrogen oxides are disposed, and then passed through the iron-made reactor wherein nitrogen oxides are reduced. These duct, wet electrostatic precipitator, heater, reactor, etc. means are covered with a heat insulating material for preventing the lowering of the temperature.

The results are shown below.

Analysis of the gas at the inlet of the wet electrostatic precipitator (in the initial stage)

| | | |
|---|---|---|
| $N_2$ | 83.0 % | (in dry gas) |
| $CO_2$ | 12.1 % | (in dry gas) |
| $O_2$ | 4.5 % | (in dry gas) |
| CO | 0.4 % | (in dry gas) |
| NO | 200 ppm | (in dry gas) |
| $NO_2$ | 0 ppm | (in dry gas) |
| $SO_2$ | 200 ppm | (in dry gas) |
| $SO_3$ | 15 ppm | (in dry gas) |
| Total mists | 16 $g/Nm^3$ | (in dry gas) |
| Dusts | 30 $mg/Nm^3$ | (in dry gas) |
| Na | 1.0 $mg/Nm^3$ | (in dry gas) |
| Moisture | 13.6 % | (in total gas) |

Conditions for operation of the wet electrostatic precipitator

| | |
|---|---|
| Flow of gas to be treated: | 170 $Nm^3/hr$ |
| Gas retention time: | 27 seconds |
| Voltage – current: | 34 kV – 3.5 mA |
| Current density of collecting electrodes: | 0.22 $mA/m^2$ |
| Distance between collecting electrodes: | 120 mm |

Analysis of the gas at the outlet of the wet electrostatic precipitator (in the initial stage)

| NO | 200 ppm (in dry gas) |
|---|---|
| $NO_2$ | 0 ppm (in dry gas) |
| $SO_2$ | 200 ppm (in dry gas) |
| $SO_3$ | 1 ppm (in dry gas) |
| Total mists | 2.5 g/$Nm^3$ (in dry gas) |
| Dusts | 6 mg/$Nm^3$ (in dry gas) |
| Na | 0.2 mg/$Nm^3$ (in dry gas) |

Temperature at the outlet of the heater: 350° C

Conditions for operation of the reactor for reducing nitrogen oxides

The charged amount of $NH_3$ gas: Equimolar amount to NO (added at the inlet of the reactor)
Temperature of the first dummy catalyst layer and the second catalyst layer: 350° C
The first dummy catalyst layer: 4-6 mm$\phi$ particle, $\alpha$-alumina carrier, a fixed bed, 26.2 liters
The second catalyst layer: 4-6 mm$\phi$ particle, molybdenum oxide — vanadium oxide — $\alpha$-alumina carrier, a fixed bed, 26.2 liters.

Space velocity of the gas

On the first catalyst layer and the second catalyst layer: each 6,500 $hr^{-1}$ (STP)

Analysis of the gas at the outlet of the reactor (in the initial stage)

| NO | 6 ppm (the removal ratio of NO: 97.0%) |
|---|---|

In the above tests, the analysis of nitrogen oxides (NOx) is carried out by a NOx meter by the chemical luninescence method. Even after the continuous reaction for 1,000 hours, the removal ratio of nitrogen oxides is 97.0% and no lowering of the removal ratio is observed.

The analysis method for other components are Orsat method for $CO_2$, CO, $O_2$ and $N_2$; a method provided in JIS K-0103 for $SO_2$ and $SO_3$; I type method (silica cylindrical filter) provided in JIS Z-8808 for dusts; a method provided in JIS K-0102 for Na; a method provided in JIS Z-8808 for moisture, and the total mists are determined by the increase of the weight of the filter (before its drying) when the dusts are measured.

On the gas flow after the reactor an iron-made blower for discharging the gas after removing nitrogen oxides is arranged, and the gas before being blown into the blower is heated to 150° C. Even after the continuous reaction for 1,000 hours, a deposit of materials is scarcely observed in the blower.

Immediately after the initiation of the reaction, the differential pressure of the first catalyst layer (dummy catalyst layer) is 20 mmAq and that of the second catalyst layer (catalyst layer for removing nitrogen oxides) is 20 mmAq, and after the continuous reaction for 1,000 hours, the differential pressure of the first catalyst layer is 24 mmAq and that of the second catalyst layer is 20 mmAq. Thus, the differential pressure of the first catalyst layer is slightly increased, but that of the second catalyst layer does not change.

EXAMPLE 2

The reaction as mentioned in Example 1 is continued additionally for 2,000 hours (totally 3,000 hours).

As the result, the removal ratio of NO is 95.0%. Thus, the removal ratio is almost not lowered. Besides, a deposit of materials is scarcely observed in the blower set after the reactor, either.

Immediately after the initiation of the reaction, the differential pressure of the first catalyst layer is 20 mmAq and that of the second catalyst layer is 20 mmAq, and after the continuous reaction for 3,000 hours, the differential pressure of the first catalyst layer is 31 mmAq and that of the second catalyst layer is 22 mmAq. Thus, the differential pressure of the first catalyst layer is somewhat increased, but that of the second catalyst layer is almost not increased.

REFERENCE EXAMPLE 1

Example 1 is repeated except that the first catalyst layer (dummy catalyst layer) is not provided (the second catalyst layer is a new one). The results are shown below.

Analysis of the gas at the outlet of the wet electrostatic precipitator (in the initial stage)

| NO | 205 ppm (in dry gas) |
|---|---|
| $NO_2$ | 0 ppm (in dry gas) |
| $SO_2$ | 195 ppm (in dry gas) |
| $SO_3$ | 1 ppm (in dry gas) |
| Total mists | 2.0 g/$Nm^3$ (in dry gas) |
| Dusts | 5 mg/$Nm^3$ (in dry gas) |
| Na | 0.2 mg/$Nm^3$ (in dry gas) |

Temperature at the outlet of the heater: 350° C

Conditions for operation of the reactor

The charged amount of $NH_3$ gas: Equimolar amount to NO (added at the inlet of the reactor)
Temperature of the catalyst layer: 350° C
The first dummy catalyst layer: not filled
The second catalyst layer: Molybdenum oxide — vanadium oxide — $\alpha$-alumina carrier, a fixed bed, 26.2 liters
Space velocity of the gas: On the second catalyst layer — 6,500 $hr^{-1}$ (STP).

Analysis of the gas at the outlet of the reactor (in the initial stage)

| NO | 4 ppm (the removal ratio of NO: 98.0 %) |
|---|---|
| $NO_2$ | 0 ppm |

After the continuous reaction for 3,000 hours, the removal ratio of NO is lowered from 98.0% to 81.0%, and the differential pressure of the second catalyst layer is increased from 20 mmAq to 29 mmAq.

REFERENCE EXAMPLE 2

In accordance with the process as shown in the accompanying drawing, a part of the exhaust gas (55° C) discharged from a sulfur oxides-recovering unit by a wet process (absorbent: $Na_2SO_3$ which is repeatedly used after being regenerated) constructed in a boiler plant is taken out through an iron-made duct, heated to 150° C with the first electric heater (iron-made), passed through a small, stainless steel-made dry electrostatic precipitator, heated further with the second electric heater (iron-made), mixed with ammonia gas before an iron-made reactor, and then passed through the iron-made reactor wherein the nitrogen oxides are reduced. These duct, heater, dry electrostatic precipitator, reactor, etc. means are covered with a heat insulating material for preventing the lowering of the temperature.

The results are shown below.

Analysis of the gas at the inlet of the first heater (in the initial stage)

| | |
|---|---|
| NO | 195 ppm (in dry gas) |
| $NO_2$ | 0 ppm (in dry gas) |
| $SO_2$ | 200 ppm (in dry gas) |
| $SO_3$ | 15 ppm (in dry gas) |
| Total mists | 15 g/$Nm^3$ (in dry gas) |
| Dusts | 32 mg/$Nm^3$ (in dry gas) |
| Na | 1.0 mg/$Nm^3$ (in dry gas) |

Temperature at the outlet of the first heater: 150° C

Conditions for operation of the dry electrostatic precipitator

| | |
|---|---|
| Flow of gas to be treated: | 170 $Nm^3$/hr |
| Gas retention time: | 14 seconds |
| Voltage – current: | 30 kV – 9mA |
| Current density of collecting electrodes: | 0.34 mA/$m^2$ |
| Distance between collecting electrodes: | 120 mm |

Analysis of the gas at the outlet of the dry electrostatic precipitator (in the initial stage)

| | |
|---|---|
| NO | 195 ppm (in dry gas) |
| $NO_2$ | 0 ppm (in dry gas) |
| $SO_2$ | 200 ppm (in dry gas) |
| $SO_3$ | 15 ppm (in dry gas) |
| Total mists | 0 g/$Nm^3$ (in dry gas) |
| Dusts | 2 mg/$Nm^3$ (in dry gas) |
| Na | 0.1 mg/$Nm^3$ (in dry gas) |

Temperature at the outlet of the second heater: 350° C

Conditions for operation of the reactor: the same as in Example 2

Analysis of the gas at the outlet of the reactor (in the initial stage)

| | |
|---|---|
| NO | 6 ppm (the removal ratio of NO: 97.0%) |
| $NO_2$ | 0 ppm |

On the gas flow after the reactor, an iron-made blower for discharging the gas after removing nitrogen oxides is arranged, and the waste gas before being blown into the blower is heated to 150° C. After the continuous reaction for 1,000 hours, a significant deposit of materials is observed on the blades of the blower. The X-ray analysis of the deposit detects ammonium sulfate: $(NH_4)_2SO_4$ and ammonium iron (III) sulfate: $(NH_4)_3Fe(So_4)_3$.

After the continuous reaction for 1,000 hours, the removal ratio of NO is lowered from 97.0% to 72.0%, and the differential pressure of the second catalyst layer is increased from 18 mmAq to 24 mmAq.

What is claimed is:

1. A method for removing nitrogen oxides from a combustion gas which comprises first removing sulfur oxides by a wet process comprising absorption in an aqueous or slurry of an effective absorbent for said sulfur oxides and secondly removing nitrogen oxides by a dry catalytic reduction, wherein the gas obtained after removing the sulfur oxides by said wet process is passed through a wet electrostatic precipitator to remove most of the impurities therefrom, passed through a dummy catalyst layer which is not catalytically active for reducing the nitrogen oxides with ammonia and which comprises carrier particles made of the same carrier as is employed in the second catalyst layer to remove the remaining impurities therefrom, and then passed through a second catalyst layer comprising a metal oxide effective for reducing the nitrogen oxides to nitrogen gas in the presence of ammonia.

2. The method according to claim 1, wherein the gas is passed through the said second catalyst layer at a temperature of 250° to 450° C and at a space velocity of 1,000 to 20,000 $hr^{-1}$ (STP).

3. The method according to claim 1, wherein the ammonia is used in an amount of 1.0 to 2.0 times of the stoichiometric amount with respect to the nitrogen oxides.

4. The method according to claim 1, wherein the wet electrostatic precipitator is operated under the following conditions a the electric field strength: 2,500 to 6,000 V/cm, the current density of the collecting electrodes: 0.2 to 0.8 mA/$m^2$ and the retention time of the gas between the electrodes: 1 to 30 seconds.

5. The method according to claim 1, wherein the dummy catalyst layer is in the form of a fixed bed or a moving bed and said second catalyst layer is in the form of a fixed bed.

6. The method according to claim 1, wherein the dummy catalyst layer in the form of a fixed bed and the second catalyst layer in the form of a fixed bed are disposed in the same vessel.

7. The method according to claim 1, wherein the absorbent for the sulfur oxides is an aqueous solution or a slurry of sodium sulfite, potassium sulfite or calcium hydroxide.

8. The method according to claim 1, wherein the carrier for the catalyst is alumina, silica, aluminosilicate, diatomaceous earth, silicon carbide or titanium oxide.

9. The method according to claim 1, wherein said metal oxide is an oxide of vanadium, molybdenum or tungsten, or a mixture thereof, on a suitable carrier.

10. In a method for removing sulfur oxides and nitrogen oxides from a combustion exhaust gas by first recovering the sulfur oxides by a wet process comprising absorption in an aqueous solution or slurry of an effective absorbent for said sulfur oxides to remove the sulfur oxides therefrom and then by reducing the nitrogen oxides contained in said gas with ammonia to nitrogen gas in contact with a metal oxide catalyst effective for reducing the nitrogen oxides to nitrogen gas in the presence of ammonia, the improvement for prolonging the life of said metal oxide catalyst which comprises passing the wet gas obtained after removing said sulfur oxides therefrom through a wet electrostatic precipitator and then through a dummy catalyst layer which is not catalytically active for reducing the nitrogen oxides with ammonia and which comprises carrier particles made of the same carrier as is employed in the metal oxide catalyst in order to remove dusts and condensable gas components therefrom, and introducing the resulting gas into said metal oxide catalyst to reduce the nitrogen oxides to nitrogen gas with ammonia.

* * * * *